(12) United States Patent
Zoller

(10) Patent No.: US 11,284,476 B1
(45) Date of Patent: Mar. 22, 2022

(54) SYSTEMS AND METHODS FOR COMMISSIONING NODES OF A WIRELESS NETWORK

(71) Applicant: Synapse Wireless, Inc., Huntsville, AL (US)

(72) Inventor: Jeremy Jacob Zoller, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

(21) Appl. No.: 16/750,957

(22) Filed: Jan. 23, 2020

(51) Int. Cl.
*H04W 84/18* (2009.01)
*H04W 40/10* (2009.01)
*H04W 76/11* (2018.01)
*H04W 40/24* (2009.01)
*H04L 1/18* (2006.01)

(52) U.S. Cl.
CPC .......... *H04W 84/18* (2013.01); *H04L 1/1867* (2013.01); *H04W 40/10* (2013.01); *H04W 40/24* (2013.01); *H04W 76/11* (2018.02)

(58) Field of Classification Search
CPC ..... H04W 40/04; H04W 40/10; H04W 40/24; H04W 40/244; H04W 40/32; H04W 60/00; H04W 60/04; H04W 72/02; H04W 76/10; H04W 76/11; H04W 76/12; H04W 76/14; H04W 76/15; H04W 84/18; H04L 1/1867

See application file for complete search history.

(56) References Cited

U.S. PATENT DOCUMENTS

| | | | |
|---|---|---|---|
| 8,130,673 B2 | 3/2012 | Ewing et al. | |
| 8,265,674 B2 | 9/2012 | Choong et al. | |
| 8,392,606 B2 | 3/2013 | Banks et al. | |
| 9,226,220 B2 | 12/2015 | Banks et al. | |
| 9,374,874 B1 | 6/2016 | Ewing | |
| 2011/0149803 A1 | 6/2011 | McCormack et al. | |
| 2012/0082062 A1 | 4/2012 | McCormack | |
| 2015/0373753 A1* | 12/2015 | Turon | H04W 72/048 370/254 |
| 2016/0248629 A1* | 8/2016 | Erdmann | H04L 41/084 |

* cited by examiner

*Primary Examiner* — Peter Chen
(74) *Attorney, Agent, or Firm* — Maynard Cooper & Gale, P. C.; Jon E. Holland

(57) ABSTRACT

Nodes of a wireless network are automatically commissioned for communication. In this regard, the nodes of a wireless network are configured to recognize a primary network identifier and a default network identifier. A first node to be commissioned transmits a join request that includes the default network identifier. Neighboring nodes that receive the join request transmit a reply that includes network parameters, such as the primary network identifier, for enabling the first node to communicate on the wireless network. Thereafter, the first node uses such network parameters to communicate on the network.

17 Claims, 4 Drawing Sheets

SYSTEMS AND METHODS FOR COMMISSIONING NODES OF A WIRELESS NETWORK

RELATED ART

When installing a wireless network, it is usually necessary for the nodes of the network to be configured with certain network parameters in a commissioning process to enable the nodes to communicate with one another. As an example, during a commissioning process, a node might be assigned a network identifier and node address, among other parameters. The node address is an identifier that uniquely identifies the node relative to the other nodes of the network. This address may be used by other nodes of the network to route or otherwise send messages to the node being commissioned. The network identifier, on the other hand, uniquely identifies the wireless network from other wireless networks, referred to in this context as "foreign networks," within range of the identified network. Each message transmitted by a node of a wireless network includes the network identifier identifying such wireless network in a network identifier (NetID) field, and each node of the network checks such field before processing a received message. If the NetID field does not match the network identifier for the network, then the node drops the message without processing it, thereby preventing the node from processing messages received from foreign networks. Thus, before communicating within a wireless network, a node must be provisioned with at least a network identifier recognized by other nodes of the wireless network.

Commissioning is often manually performed where a user, such as a network administrator, manually provisions each node with certain network parameters, such as a node address and a network identifier. In some cases, the user must travel to the location of the node and manually input the network parameters into the node or use a short-range communication device (e.g., a Bluetooth device) device to transmit the network parameters directly to the node. Unfortunately, such a manual commissioning process is time consuming, burdensome, and tedious. Indeed, commissioning a large network, such as a network having hundreds or thousands of nodes, can take several days and can be extremely expensive.

In order to address these issues, attempts have been made to automate or at least simplify the commissioning process. However, automating the commissioning process in a reliable way can be difficult or problematic. In this regard, any error in the commissioning process can result in a node being unable to communicate. For example, if a first node is commissioned with the wrong network identifier, then the other nodes of the network may be configured to drop or otherwise ignore messages from the first node so that the first node is effectively "lost" from the network. Discovering that a node has been misconfigured may be difficult, and even if it can be determined that a node cannot be located on the network, discovering the physical location of the misconfigured node may be difficult. Thus, better techniques for easily and reliably commissioning nodes of a wireless network are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present application generally relates to systems and methods for automatically commissioning nodes of a wireless network. In some embodiments of the present disclosure, the nodes of a wireless network are configured to recognize a network identifier, referred to herein as a "primary network identifier," and a default network identifier. The primary network identifier uniquely identifies the network from other networks and is used for communicating messages within the network. This primary network identifier may be communicated to the nodes during commissioning, as will be described in more detail below. The default network identifier is a predefined network identifier that each node is configured to recognize prior to commissioning and is not unique to the wireless network. That is, nodes are configured to recognize the default network identifier regardless of the network to which they are assigned.

When a node is to be commissioned for use on a wireless network, a user provides an input to the node to trigger a commissioning process for the node, referred to in this example as the "joining node." Such input may be manual, such as a press of a button on the joining node, though other types of inputs in other embodiments are possible. In response, the joining node transmits a message, referred to herein as a "join request," requesting to join the network of neighboring nodes that respond to the join request. The joining node, which is not yet aware of the primary network identifier for the network, includes the default network identifier in the join request. The neighboring nodes that receive the join request respond by transmitting a reply that includes sufficient information to commission the joining node for communication on the network. As an example, the reply may include the primary network identifier of the network. Thereafter, the joining node may use the primary network identifier to communicate messages over the network. Thus, the process of commissioning the joining node for communication on the network by at least assigning the primary network identifier to the joining node is automatically performed without requiring a user to manually assign the primary network identifier to the joining node.

Figure 1:
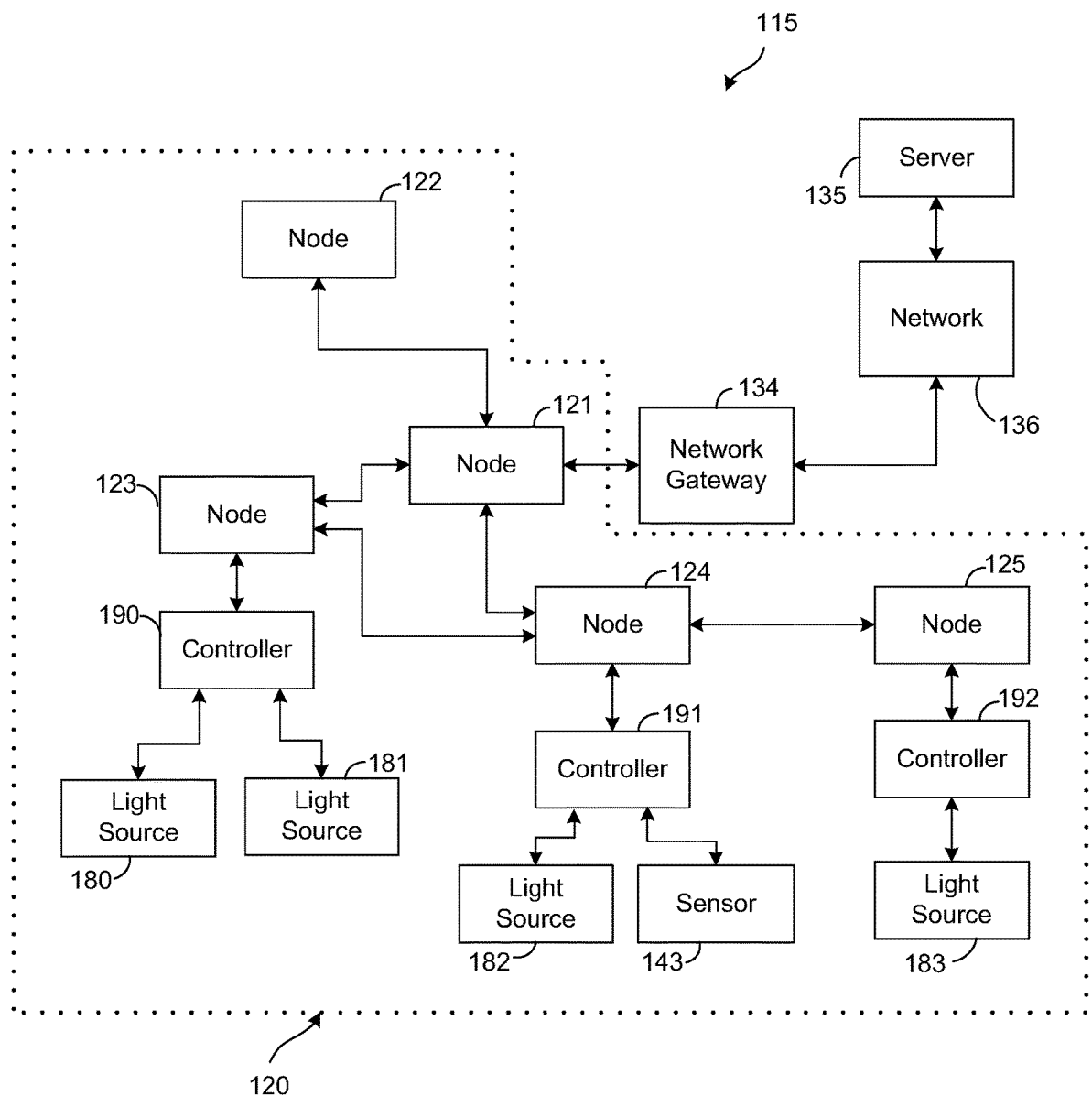
FIG. 1 is a block diagram illustrating an exemplary embodiment of a communication system having at least one wireless network.

FIG. 1 displays an exemplary embodiment of a communication system 115 having at least one wireless network 120. For illustrative purposes, the system 115 will be described in the context of a lighting control system that is used to control light sources at one or more locations at a facility, such as a manufacturing facility or other building where lights may be used and controlled. However, the system 115 may be any type of system that employs a wireless network in other embodiments.

As shown by FIG. 1, the system 115 has a server 135 connected to at least one gateway 134 through a network 136. The network 136 may comprise any conventional network, including any wide area network (WAN), such as the Internet, or local area network (LAN). The gateway 134 serves as an interface between the wireless network 120 and the network 136. In this regard, the gateway 134 may receive from the wireless network 120 messages in accordance with a protocol of the network 120 and convert he messages into a format compatible with the network 136. As an example, the gateway 134 may encapsulate messages from the wireless network 120 with overhead for communication of the messages through the network 136. Further, the gateway 134 may receive from the network 126 messages in accordance with a protocol of the network 136 and convert the messages into a format compatible with the wireless network 120. As an example, the gateway 134 may deencapsulate such message to remove overhead in accordance with the protocol of the network 136 and then transmit the message to one or more nodes of the wireless network 120.

As shown by FIG. 1, the wireless network 120 may be defined by a plurality of nodes 121-125 that wirelessly communicate with each other. In some embodiments, the nodes 121-125 form a wireless mesh network 120, but other types of wireless networks may be formed by the nodes 121-125 in other embodiments. As further shown by FIG. 1, at least some of the nodes 121-125 may be coupled to lighting controllers 190-192 that are coupled to light sources 180-183, and each lighting controller 190-192 may be configured to control each light source 180-183 coupled to it. In some cases, the lighting controllers 180-183 may be coupled to one or more sensors 140-143, such as motion sensors or light switches, for receiving input that may be used to control the light sources 180-183.

In some embodiments, the server 135 may be configured to transmit to the nodes commands instructing the lighting controllers 190-192 to control the light sources 180-183, as may be desired. Further, the server 135 may receive information from the lighting controllers 180-183 regarding the operation of the light sources 180-183 or conditions sensed by the sensors 140-142 for use in controlling the light sources 180-183. As an example, the server 135 may instruct the lighting controllers 190-192 to control and change the states of the light sources 180-183

While FIG. 1 is described in the context of a lighting system, the system 115 may be used in other applications in other embodiments. As an example, various applications for wireless networks are described in commonly-assigned U.S. Pat. No. 7,970,871, entitled "Systems and Methods for Dynamically Configuring Node Behavior in a Sensor Network," and granted on Jun. 28, 2011; and commonly-assigned U.S. Pat. No. 9,619,989, entitled "Asset Tracking Systems and Methods," and granted on Apr. 11, 2017, both of which patents are incorporated herein by reference.

Figure 2:
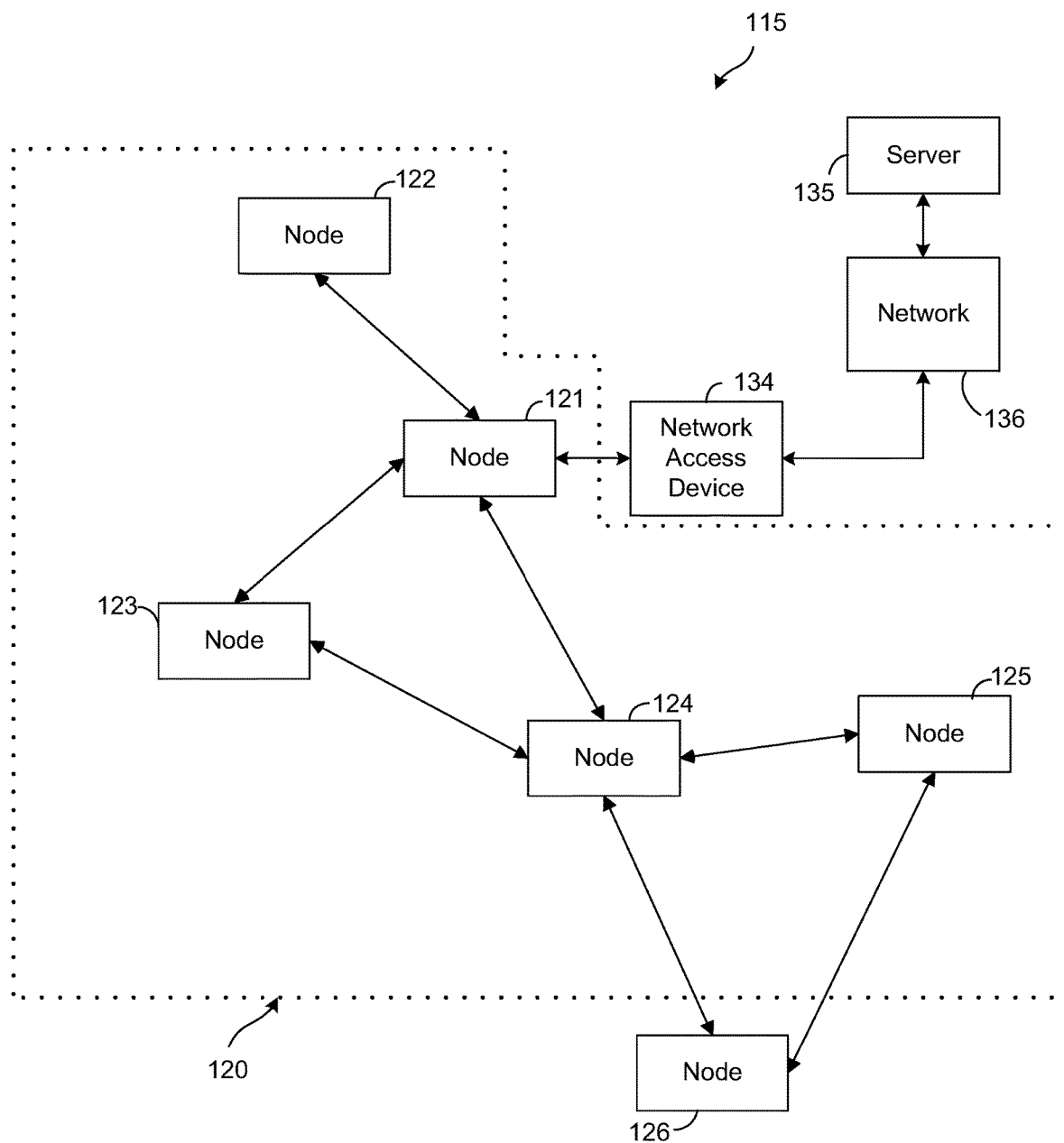
FIG. 2 is a block diagram illustrating select components of the communication system depicted by FIG. 1.

FIG. 2 is a simplified block diagram of the system 115 with some of the elements of FIG. 1 removed for simplicity of illustration. Referring to FIG. 2, each node 121-125 is able to communicate with any of the other nodes 121-125. In some embodiments, nodes 121-125 form a mesh network where each message hops from node-to-node until it arrives at its intended destination. Either unicast or multicast messaging may be used by the nodes 121-125. As known in the art, a multicast message is typically received and processed by a plurality of nodes whereas a unicast message typically follows a defined path through the network 120. A multicast message has a time-to-live (TTL) value that is used to prevent perpetual propagation of the message through the network 120. Each node 121-125 that receives a multicast message is configured to retransmit the message provided that the TTL value is less than a predefined threshold. Before retransmitting the message, the node is configured to decrement or otherwise reduce the TTL value. Once the predefined threshold is reached or passed, the multicast message is no longer retransmitted. Thus, by controlling the TTL value, the number of times that the multicast message is retransmitted can be controlled.

As an example, a two-hop multicast message is a multicast message that is retransmitted for two hops. In this regard, the source node for a two-hop multicast message controls the TTL value such that it reaches or passes the predefined threshold when the message is retransmitted by one node. Thus, each node that receives the message directly from the source node retransmits the message, but the nodes that receive the retransmissions do not further transmit the message. As another example, a one-hop multicast message is a message that is transmitted for one hop. In this regard, the source node for a one-hop multicast message controls the TTL value such that the message is not retransmitted by any node that receives it. Thus, each node that receives the message directly from the source node processes the message but does not retransmit it, and the message only reaches nodes that are within direct communication range of the source node. In other embodiments, the TTL value of a multicast message may be controlled such that the message is retransmitted for any number of hops as may be desired.

Generally, each message communicated within the network 120 has a network identifier (NetID) field that is used to prevent the nodes 121-125 from responding to messages from foreign networks. In this regard, as previously described above, the network 120 is associated with a network identifier, referred to hereafter as "primary network identifier" or "primary NetID," that uniquely identifies the network 120 from other foreign networks. During commissioning, each node 121-125 is assigned (1) a node address that uniquely identifies the node relative to the other nodes of the network 120 and (2) the primary NetID that uniquely identifies the network 120 from other networks. Each node 121-125 of the network 120 is configured to recognize the primary NetID. In this regard, when a node 121-125 receives a message that includes the primary NetID in the message's NetID field, the node 121-125 does not drop the message but rather receives and further processes it. If, however, the node 121-125 does not recognize the information in the NetID field as a valid identifier for the network 121-125, then the node 121-125 immediately drops the message without further processing it. Thus, if a message does not include an identifier in the NetID field recognized by the receiving node as a valid network identifier, the receiving the node drops the message without further processing it.

The nodes 121-125 are configured to recognize at least one additional identifier, a default identifier or "default NetID," in addition to the primary NetID, as a valid network identifier. As previously described above, this default NetID is not necessarily unique to the network 121-125. As an example, each node manufactured by a certain manufacturer and sold to multiple customers may be configured during manufacturing to recognize the default NetID. In other embodiments, the nodes 121-125 may be configured at other times and by other entities to recognize the default NetID.

When a node 121-125 receives a message that includes the default NetID, the node 121-125 is not configured to discard the message as it would for a message having a NetID field not recognizable to the node, but rather is configured to receive and process the message as it would for a message containing the primary NetID in the message's NetID field.

At various times, it may be desirable to add a node to the network 120. As an example, nodes may be added during installation of the network 120 or even after installation is complete, such as for example to grow the network as demand increases or needs otherwise change. For illustrative purposes, referring to FIG. 2, assume that it is desirable to add the node 126 to the network 115. When a node 126 is added to the network 120, the node is commissioned so that node 126 is able to communicate with the other nodes of the network 120.

Before commissioning, the node 126 is unaware of the primary NetID used by the nodes 121-125 of the network 126. However, the node 126 has been preconfigured with the default NetID. As an example, the default NetID might be stored in the node 126 during manufacturing or at some other time period prior to commissioning in order to enable the node 126 to at least temporarily communicate with a node 121-125 of the network 120 in order to obtain network parameters for commissioning the node 126 for communication on the network 120.

Once the node 126 has been installed or otherwise positioned to be within range of at least one node 121-125 of the network, a user may provide an input to the node 126 indicating that the node 126 is to attempt to join the network 120. There are various techniques that may be used to provide such in input. In some embodiments, the node 126 has a button that a user activates (e.g., presses) when the node 126 is to join the network 120. In other embodiments, other types of input devices, such as a switch, may be used to provide an input indicating when the node 126 is to try to join the network 120. In some embodiments, the input may be communicated to the node 126 wirelessly. As an example, the user may have a mobile communication device, such as a smartphone, tablet, or laptop computer, that can be interfaced with the node 126 for communication, and the user may use such mobile communication device to transmit an input to the node 126. In some embodiments, the connection may be wireless or with a physical connection, such as one or more wires. In some embodiments, the connection is a short-range wireless connection via Bluetooth or some other short-range wireless communication protocol, though other techniques for enabling communication with the node 126 are possible.

Note that using a physical input device of the node 126, such as a button or switch, enables the user to quickly and reliably provide the input for triggering a join request by the node 126. In this regard, establishing a wireless connection with the node 126 may take a finite amount of time and effort by the user. Further, in establishing the wireless connection, the user may need to take care to ensure that he or she is connecting to the correct node 126, and this may become more difficult as the number of nodes within range of the user's communication device increases. In addition, even if the time and effort for establishing a wireless connection is small, the burden on the user of performing this step for each node to be commissioned may become significant as the number of nodes to be commissioned increases.

Once the node 126 has received an input indicating that it should attempt to join the network 126, the node 126 is configured to wirelessly transmit a message, referred to as a "join request." In one embodiment, the join request is a one-hop multicast message such that the message should be received and processed by any node 121-125 that is within range of the node 126. Since the message is a one-hop multicast message, any node 121-125 that does receive the join request does not attempt to retransmit it. In other embodiments, other types of messages, such as multicast messages with a larger number of hops, are possible. However, as will become more apparent below, it is sufficient for commissioning of the new node 126 if a single node 121-125 responds to the join request. Thus, there is no need for communication of the join request to extend beyond one hop from the node 126 and doing so would needlessly increase network traffic.

In some embodiments, the join request has a field, referred to hereafter as "message type field," indicating message type to any node 121-125 that receives it. Such field is defined to indicate that the message is a join request for which the nodes 121-125 are configured to reply with network parameters, such as the primary NetID for the network 120. In some embodiments, the join request also may include an address of the node 126, such as the node's media access control (MAC) address.

Each node 121-125 of the network 120 that receives the join request is configured to respond to the join request by transmitting a reply message to the node 126. Such a reply message may be a one-hop multicast message, but other types of messages are possible in other embodiments. In some embodiments, the reply includes information, such as the primary NetID of the network 120, that may be used to commission the node 126 for communication on the network 120. The reply may also include the address of the node 126 from the join request so that the node 126 can recognize the message as a reply to its original join request.

Upon receiving a reply to the join request, the node 126 is configured to update its communication settings for communication on the network 120 based on the information in the reply. As an example, the node 126 may extract the primary NetID from the reply and store the primary NetID for use in communicating on the network 120. Specifically, the node 126 may update its settings to recognize the primary NetID, and the node 126 may thus receive and process messages that include the primary NetID in the NetID field. The node 126 may also insert the primary NetID in the NetID field of messages transmitted by the node 126 so that the messages will be received and processed by other nodes 121-125 of the network 120. In other embodiments, other network parameters may be included in the reply, such an encryption key used for encrypting or decrypting messages communicated on the network 120 or a channel identifier identifying a channel used for communication on the network 120.

In some embodiments, the node 126 is configured to continue the commissioning process after receiving the primary NetID from a neighboring node. As an example, after obtaining the primary NetID, the node 126 may be configured to use the primary NetID to communicate with the server 135 using multicast messages or other types of messages. During such communication, the server 135 may assign a node address to the node 126 and inform the node 126 of the assigned network address. Thereafter, the node 126 may use such node address and the primary NetID in communicating within the network 120.

The node 126 also may be configured to transmit location information indicative of its current location to the server 135. As an example, the node 126 may be configured to measure the received signal strengths of messages from neighboring nodes 121-125 and report this information to the server 135, which may then use such information to determine the location of the node 126 via triangulation, trilateration, or some other algorithm for determining location. The server 135 is configured to store the node address of the node 126 and to correlate such node address with various information about the node 126, such as the node's location, for use in managing the network 120.

Note that triggering the node to join the network 126 in response to an input from a user, as described above, helps to control when the node 126 attempts to join a network and, thus, helps to prevent the node 126 from joining the wrong network. In this regard, as described above, the default NetID is not unique to the network 120, and it is possible for foreign networks to have nodes purchased from the same manufacturer or otherwise configured to recognize the default NetID. Triggering the join request in response to user input helps to prevent the node 126 from making join attempts before it is installed, such as during transport to the location of the network 120.

Further, if the node 126 is within range of a foreign network such that the node 126 receive replies from multiple networks (i.e., multiple replies to the same join request have different network identifiers), the node 126 may be configured to select the reply having the strongest received signal strength and join the network identified by the network identifier from such reply. This feature is based on the assumption that the closest node responding to the join request is most likely to be a member of the intended network. Thus, the node 126 may be configured to measure the received signal strength of each reply to the join request, and then commission itself for joining the network identified by the reply having the highest received signal strength. In other embodiments, other techniques for distinguishing between replies received from multiple networks are possible.

To better illustrate various concepts described herein, an exemplary method for auto-commissioning a node 126 for communication on a wireless network 120 will be described in more detail below with reference to FIG. 3. It should be emphasized that the method of FIG. 3 is exemplary, and various changes and modifications to such method would be apparent to a person of ordinary skill upon reading this disclosure.

Figure 3:
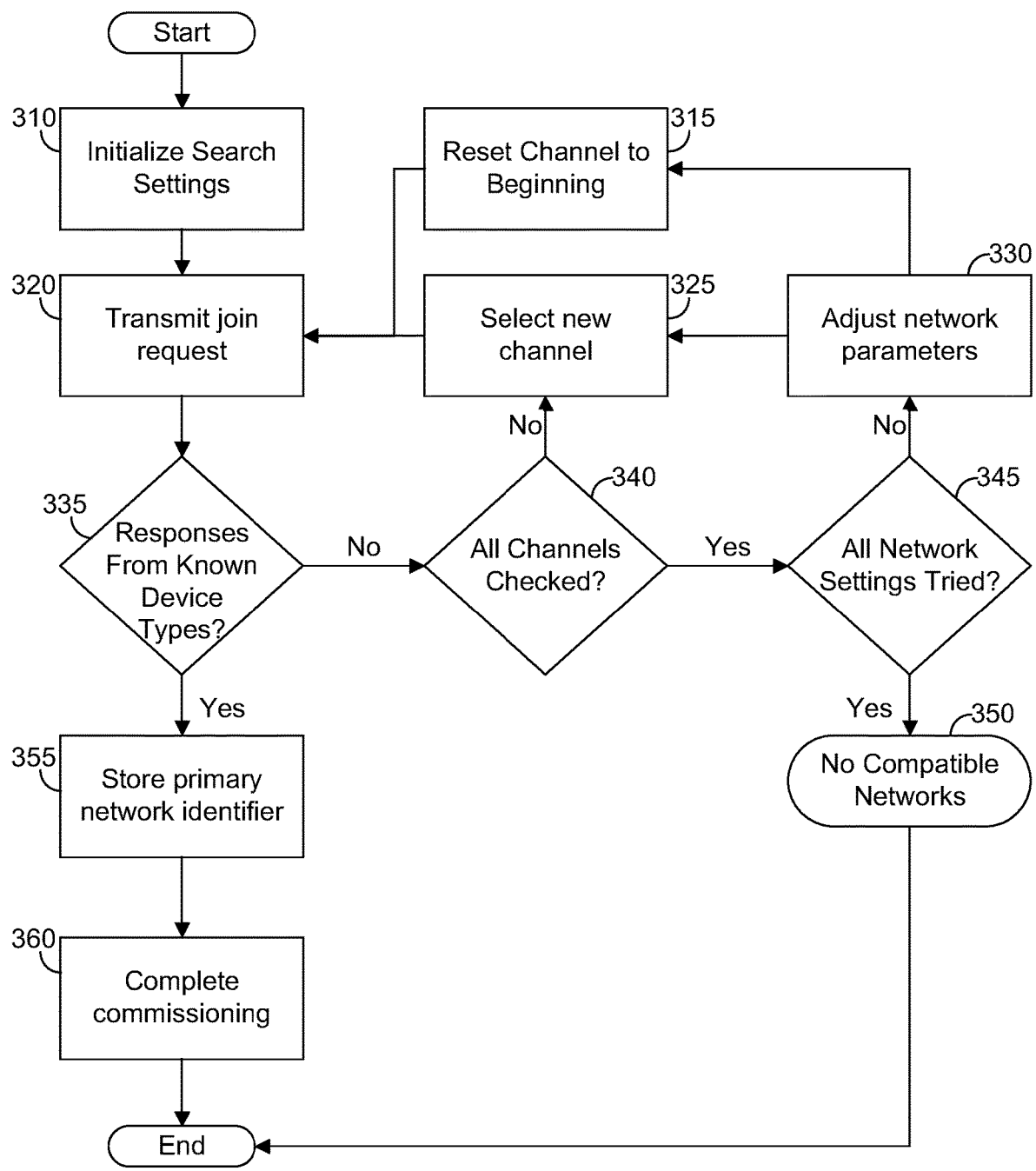
FIG. 3 is a flow chart illustrating an exemplary method for auto-commissioning a node of a wireless network, such as is depicted by FIG. 1.

The exemplary auto-commissioning process shown by FIG. 3 starts at step 310 after receiving a user input indicating that such process should be commenced, such as a button push on the node 126. At step 310, the node 126 (FIG. 2) initializes search settings. As an example, the node 126 may initialize a setting, referred to as the "current channel" indicating a current channel to be used for attempting communication with a network. In other examples, other types of settings may be initialized such as whether cyclic redundancy check (CRC) is to be used. At step 320, the node 126 (FIG. 2) then sends a join request on the current channel indicated by its current settings.

As described above, the join request is preferably sent using a default network identifier (the "default NetID"), and the nodes 121-125 of the network 120 are configured to recognize both the default NetID and the primary NetID of the network 120. Thus, all nodes 121-125 of the network that hear the join request are configured to receive and respond to the join request. In some embodiments, the join request is a one-hop multicast message that is received and processed by each node 121-125 within range of the node 126. In other embodiments, it is unnecessary for each node 121-125 of the network 120 to recognize the default NetID.

After transmitting the join request, the new node 126 then listens for replies for a predefined period of time. At step 335, if a reply to the join request is received within the period of time, the node 126 continues to step 355. Otherwise the node 126 proceeds to step 340.

At step 340 the node 126 determines if all channels have been checked. If not, a new channel is selected at step 325, and the node 126 updates the current channel setting to indicate that the channel newly selected at step 325 should be used for communication. The node 126 then returns to step 320 and sends a join request on this newly selected channel.

If all channels are determined to have been checked at step 340, the node 126 proceeds to step 345 and checks if all network settings have been tried. If all the network settings have been tried, the node 126 proceeds to step 350 and provides an output indicating that there are no compatible networks available.

If the node 126 determines at step 345 that all the network setting have not been tried, the node 126 proceeds to step 330, and the node 126 adjusts the network settings and proceeds to step 315. At step 315, the node 126 resets the search settings to the beginning channel such that the channels are again checked with the updated settings according to the techniques described above. Note that the network settings adjusted by the node 126 at block 330 may include CRC, various encryption settings, and alternate message protocols.

At step 355, the node 126 has received at least one reply to its join request from a neighboring node 121-125. Such reply includes the primary NetID for the network 120, and the node 126 stores such primary NetID for future communications. Note that the reply may indicate other types of parameters that the node 126 stores and uses in future communications across the network 120. As an example, these network parameters might include one or more channels used by the network 120, search settings used to send the message that garnered the response, an address of a particular device, such as the server 135, used to manage the network 120, or other information that may be used in communicating across the network 120.

At step 365, the node 126 may perform various actions for completing commissioning. As an example, the node 126 may transmit a multicast message announcing its presence on the network 120. In response to this message, the nodes 121-125 may update routing tables or take other actions for accounting for the node 126 on the network 120. Further, a device responsible for managing the network 120, such as the server 135, may add the node 126 to the topology of the network 120 and begin managing the node 126, such as controlling operation of the node 126 or sending software updates to the node 126.

It should be noted that triggering a join request in response to a user input, such as activation of a button or switch or a message transmitted from a mobile communication device, is unnecessary. As an example, in some embodiments, the node 126 may be configured to attempt to join the network 120 after power up. In such an embodiment, a user may install or otherwise place the node 126 at its desired location and then power up (e.g., turn on) the node 126, which then initiates a commissioning process, as described above.

Figure 4:
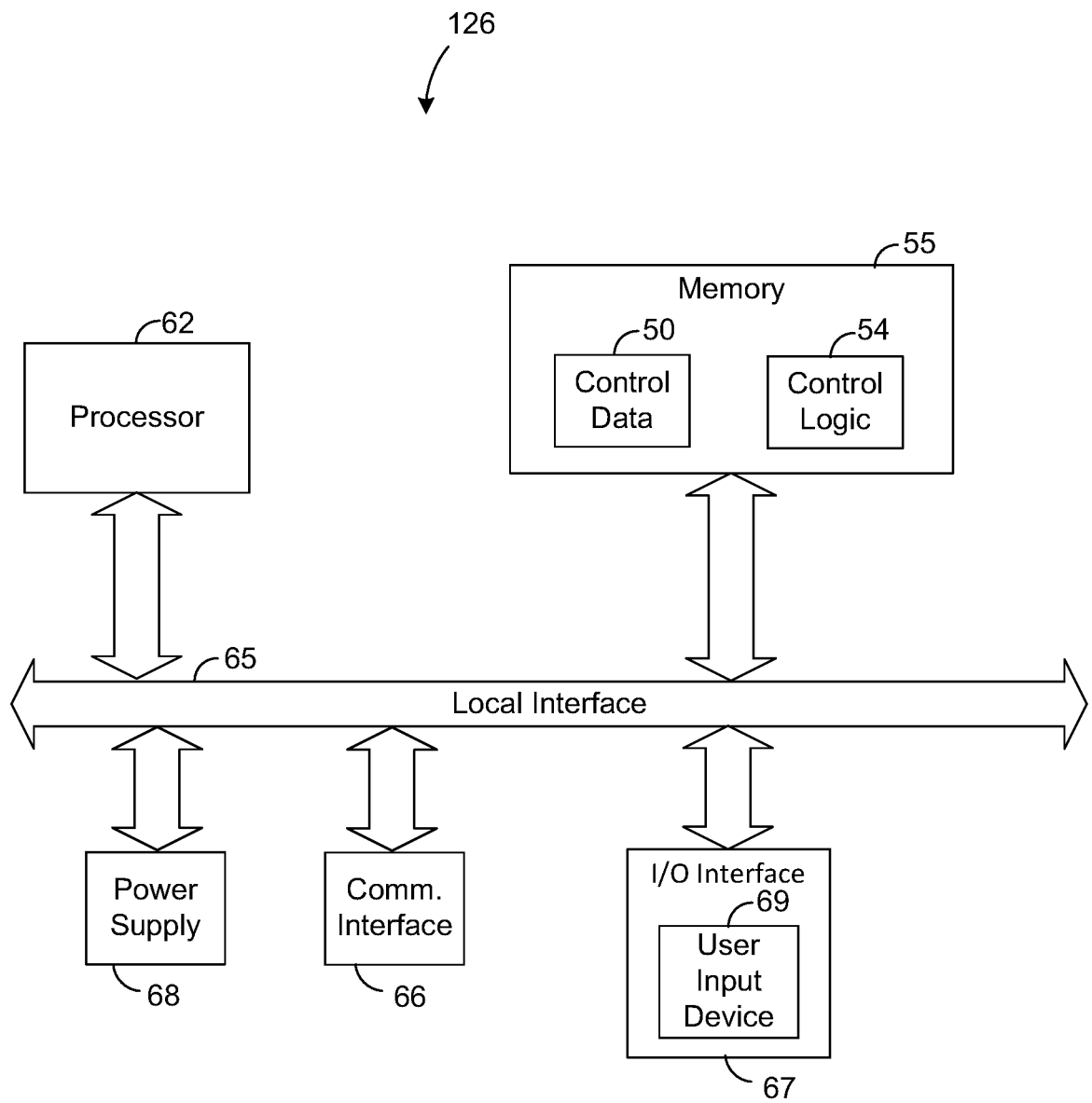
FIG. 4 is a block diagram illustrating an exemplary embodiment of a node, such as is depicted by FIG. 1.

FIG. 4 depicts an embodiment of a node 126 that is configured to join the network 120 according to the techniques described herein. As shown by FIG. 4, the node 126 includes control logic 54 that is configured to control the operation of the node 126 such as the commissioning process described above for enabling the node 126 to join the network 120. In the embodiment shown by FIG. 4, the control logic 54 is implemented in software and stored in memory 55 of the node. In other embodiments, the control logic 54 may be implemented in hardware or a combination of hardware and software. The memory 55 may also store control data 50, such as the network parameters and settings described above.

The node 126 includes at least one conventional processor 62, which includes processing hardware for executing instructions stored in memory 55. As an example, the processor 62 may include a central processing unit (CPU) or a digital signal processor (DSP). The processor 62 communicates to and drives the other elements within the node 126 via a local interface 65, which can include at least one bus.

Note that control logic 54, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The node 126 also has a communication interface 66. The communication interface 66 includes a radio frequency (RF) radio or other device for wirelessly communicating with the components of the network 120. Using the communication interface 66, the node 126 may communicate with other nodes 121-125 of the network 120 or other devices.

The node 126 can have a power supply 68, which provides electrical power to the components of the node 126. In one embodiment, the power supply 68 has an interface that allows it to plug into or otherwise interface with external component(s), such as a wall outlet or battery, and receive electrical power from such external component. If desired, the power supply 68 may incorporate one or more batteries to permit the node 126 to be independent of the external power component. Node 126 can have one or more input/output (I/O) interfaces 67 for communicating with devices, such as sensors or lighting controllers. The I/O interface 67 may include one or more user input devices 69, such as a button or switch, for receiving a user input.

Now, therefore, the following is claimed:

1. A system for commissioning nodes of a wireless network, comprising:
    a plurality of nodes forming the wireless network, including at least a first node and a second node, wherein each of the first node and the second node is configured to receive and process messages having a primary network identifier identifying the wireless network and messages having a default network identifier; and
    a third node configured to transmit a plurality of join requests in a plurality of channels, each of the join requests including the default network identifier and not including the primary network identifier, the plurality of join requests includes at least a first join request transmitted by the third node in a first channel of the plurality of channels and a second join request transmitted by the third node in a second channel of the plurality of channels, the third node configured to receive a plurality of replies to the first join request, including at least a first reply to the first join request from the first node and a second reply to the first join request from the second node, the third node configured to compare a signal strength of the first reply to a signal strength of the second reply and to select the first reply among the plurality of replies for extraction of the primary network identifier based on the signal strength of the first reply, the third node further configured to extract the primary network identifier from the first reply and to include the primary network identifier from the first reply in a network identifier field of a plurality of messages transmitted by the third node through the wireless network,
    wherein the first node is configured to transmit the first reply in response to the first join request and the second node is configured to transmit the second reply in response to the first join request.

2. The system of claim 1, wherein the third node is configured to transmit the plurality of join requests in response to a user input received by the third node.

3. The system of claim 1, wherein the first reply includes at least one network parameter for enabling the third node to communicate on the wireless network.

4. The system of claim 3, wherein the at least one network parameter includes at least one of the group including: an encryption key and a channel identifier identifying a channel used for communication on the wireless network.

5. The system of claim 1, wherein the third node has a user input device, and wherein the third node is configured to transmit the plurality of join requests in response to a user input received by the user input device.

6. The system of claim 5, wherein the user input device comprises a button.

7. The system of claim 5, wherein the user input device comprises a switch.

8. The system of claim 1, wherein the first join request is a one-hop multicast message.

9. A method for commissioning nodes of a wireless network, comprising:
    communicating a first plurality of messages by a plurality of nodes forming the wireless network, each of the first plurality of messages having a network identifier field that includes a primary network identifier identifying the wireless network, the plurality of nodes including at least a first node and a second node, wherein each of the first node and the second node is configured to respond to and process messages having the primary network identifier and messages having a default network identifier;
    transmitting, from a third node not yet commissioned for communication on the wireless network, a plurality of join requests in a plurality of channels, each of the join requests including a default network identifier in a network identifier field of the respective join request and not including the primary network identifier, wherein the plurality of join requests includes at least a first join request transmitted by the third node in a first channel of the plurality of channels and a second join request transmitted by the third node in a second channel of the plurality of channels;
    transmitting, from the first node, a first reply to the first join request transmitted by the third node, the first reply including the primary network identifier;
    transmitting, from the second node, a second reply to the first join request transmitted by the third node, the second reply including the primary network identifier;
    receiving, at the third node, a plurality of replies to the first join request, including at least the first reply and the second reply;
    comparing, at the third node, a signal strength of the first reply to a signal strength of the second reply;
    selecting, by the third node, the first reply among the plurality of replies for extraction of the primary network identifier based on the signal strength of the first reply; and
    based on the primary network identifier extracted from the first reply, transmitting a second plurality of messages from the third node through the wireless network, each of the second plurality of messages having a network identifier field that includes the primary network identifier.

10. The method of claim 9, further comprising receiving a user input at the third node, wherein the transmitting the plurality of join requests from the third node is performed in response to the user input.

11. The method of claim 9, wherein the first reply includes at least one network parameter for enabling the third node to communicate on the wireless network.

12. The method of claim 11, wherein the at least one network parameter includes an encryption key.

13. The method of claim 11, wherein the at least one network parameter includes a channel identifier identifying a channel used for communication on the wireless network.

14. The method of claim 9, further comprising receiving a user input at a user input device of the third node, wherein the transmitting the plurality of join requests from the third node is performed in response to the user input.

15. The method of claim 14, wherein the user input device comprises a button.

16. The method of claim 14, wherein the user input device comprises a switch.

17. A method for commissioning nodes of a wireless network, the wireless network having a plurality of nodes that communicate a first plurality of messages, each of the first plurality of messages having a network identifier field that includes a primary network identifier identifying the wireless network, the plurality of nodes including at least a first node and a second node, wherein each of the first node and the second node is configured to respond to and process messages having the primary network identifier and messages having a default network identifier, the method comprising:

transmitting, from a third node not yet commissioned for communication on the wireless network, a plurality of join requests in a plurality of channels, each of the join requests including a default network identifier in a network identifier field of the respective join request and not including the primary network identifier, wherein the plurality of join requests includes at least a first join request transmitted by the third node in a first channel of the plurality of channels and a second join request transmitted by the third node in a second channel of the plurality of channels;

receiving, by the third node, a plurality of replies to the first join request, including at least a first reply transmitted by the first node and a second reply transmitted by the second node, each of the first reply and the second reply including the primary network identifier;

comparing, by the third node, a signal strength of the first reply to a signal strength of the second reply;

selecting, by the third node, the first reply among the plurality of replies for extraction of the primary network identifier based on the signal strength of the first reply; and based on the primary network identifier extracted from the first reply, transmitting a second plurality of messages from the third node through the wireless network, each of the second plurality of messages having a network identifier field that includes the primary network identifier.

* * * * *